(12) United States Patent  
Hoeger

(10) Patent No.: US 7,517,192 B2  
(45) Date of Patent: Apr. 14, 2009

(54) FLOW STRUCTURE FOR A GAS TURBINE

(75) Inventor: Martin Hoeger, Erding (DE)

(73) Assignee: MTU Aero Engines GmbH, Munich (DE)

( * ) Notice: Subject to any disclaimer, the term of this patent is extended or adjusted under 35 U.S.C. 154(b) by 583 days.

(21) Appl. No.: 11/220,745

(22) Filed: Sep. 6, 2005

(65) Prior Publication Data

US 2006/0051200 A1     Mar. 9, 2006

(30) Foreign Application Priority Data

Sep. 3, 2004     (DE) ................. 10 2004 042 699

(51) Int. Cl.  
*F04D 29/42* (2006.01)

(52) U.S. Cl. .................. 415/208.1; 415/209.1; 415/193

(58) Field of Classification Search ............. 415/211.2, 415/208.4, 209.3, 193, 194, 195, 209.1, 208.2  
See application file for complete search history.

(56) References Cited

U.S. PATENT DOCUMENTS 2,990,106 A * 6/1961 Craig ..................... 415/194  
6,905,303 B2 * 6/2005 Liu et al. ................. 415/142

* cited by examiner

*Primary Examiner*—Igor Kershteyn  
(74) *Attorney, Agent, or Firm*—Kenyon & Kenyon LLP

(57) ABSTRACT

A flow structure is for a gas turbine, e.g., for an aircraft engine, in a transition channel between two compressors or in a transition channel between two turbines or in a transition channel of a turbine outlet housing downstream from a low-pressure turbine, having support ribs positioned in the transition channel spaced apart from one another around the circumference of the transition channel. A channel wall which delimits the transition channel radially on the inside and/or a channel wall which delimits the transition channel radially on the outside may be drawn inwardly into the transition channel in the area of the outflow edges of the support ribs.

20 Claims, 1 Drawing Sheet

FLOW STRUCTURE FOR A GAS TURBINE

CROSS-REFERENCE TO RELATED APPLICATIONS

The present application claims priority to Application No. 10 2004 042 699.6, entitled "Stroemungsstruktur fuer eine Gasturbine," filed in the Federal Republic of Germany on Sep. 3, 2004, which is expressly incorporated herein in its entirety by reference thereto.

FIELD OF THE INVENTION

The present invention relates to a flow structure for a gas turbine, e.g., an aircraft engine.

BACKGROUND INFORMATION

Gas turbines, such as aircraft engines, typically have multiple compressors, multiple turbines, and one combustion chamber. The multiple compressors are typically a low-pressure compressor or a medium-pressure compressor and a high-pressure compressor, and the multiple turbines are a high-pressure turbine and a low-pressure turbine. The flow through the gas turbine is in the axial direction, the low-pressure compressor or medium-pressure compressor being positioned upstream from the high-pressure compressor and the high-pressure turbine being positioned upstream from the low-pressure turbine. The flow reaches the high-pressure compressor from the low-pressure compressor or medium-pressure compressor through a transition channel between these two compressors. Such a transition channel is also positioned between the high-pressure turbine and the low-pressure turbine. A further transition channel is located in the turbine outlet housing downstream from a low-pressure turbine.

Positioning support ribs spaced apart from one another around the circumference of the transition channel in such transition channels is believed to be conventional. The support ribs are used for the passage of oil lines and sensors, for example, and for absorbing forces, because of which the support ribs are designed to be relatively thick. Support ribs which are implemented to guide the flow but not to deflect the flow are believed to be conventional. Furthermore, support ribs are believed to be conventional which have a suction side and a pressure side and therefore also assume the function of a flow deflector. The thickness of the support ribs may be approximately 30% of the length of chord of the support ribs. Because of the large relative thickness of such support ribs, large wedge angles arise at the outflow edges of the support ribs, which cause high flow delays, e.g., in the area of a channel wall delimiting the transition channel radially on the inside and/or a channel wall delimiting the transition channel radially on the outside. Secondary flows, flow separations, and therefore flow losses may arise in this manner. Furthermore, flow against gas turbine blades positioned downstream from the support ribs may be disturbed. A similar set of problems may also arise, e.g., in cooled high-pressure turbine blades having a relatively large wedge angle at the outflow edge.

SUMMARY

An example embodiment of the present invention may provide a flow structure for a gas turbine.

According to an example embodiment of the present invention, a channel wall which delimits the transition channel radially on the inside and/or a channel wall which delimits the transition channel radially on the outside is/are drawn inward into the transition channel in the area of the outflow edges of the support ribs.

The channel wall of the transition channel, e.g., the channel wall delimiting the transition channel radially on the inside and/or the channel wall delimiting the transition channel radially on the outside, is drawn inwardly into the transition channel in the area of the outflow edges of the support ribs next to the side walls thereof. The transition channel and/or flow channel is accordingly drawn inwardly exclusively near the outflow edges of the relatively thick support ribs, because of which asymmetrical contouring of the channel wall delimiting the transition channel radially on the inside and the channel wall delimiting the transition channel radially on the outside results. In this manner, the harmful influence of the thickness of support ribs having a large wedge angle at the outflow edge on the flow may be reduced. Improved quality of flow against blade arrays positioned downstream from the support ribs may be achieved. Furthermore, the overall length of the support ribs and of the transition channel may be shortened. If the flow structure hereof is used in turbines, noise developed by the gas turbine may be reduced, since there may be less interaction between the support ribs or the turbine blades and the blade array positioned downstream.

The inner channel wall and/or the outer channel wall between two neighboring support ribs in the area of the outflow edges thereof may be drawn inward into the transition channel exclusively next to the side walls of the support ribs, while in contrast, in the area of half the spacing between the two neighboring support ribs, the inner channel wall and/or the outer channel wall may not be drawn inward.

The inner channel wall and/or the outer channel wall may be arched outwardly out of the transition channel next to the inflow edges of the support ribs.

A flow structure for a flow channel of a high-pressure turbine is also described herein.

According to an example embodiment of the present invention, a flow structure for a gas turbine includes: support ribs arranged in a transition channel and spaced apart from each other around a circumference of the transition channel, the transition channel arranged one of (a) between two compressors, (b) between two turbines, and (c) in a turbine outlet housing downstream from a low-pressure turbine; and at least one of (a) a first channel wall that delimits the transition channel radially on an inside and (b) a second channel wall that delimits the transition channel radially on an outside extending into the transition channel in an area of outflow edges of the support ribs.

The gas turbine may include a gas turbine for an aircraft engine.

At least one of (a) the first channel wall and (b) the second channel wall may extend into the transition channel between two adjacent support ribs in the area of the outflow edges next to side walls of the support ribs.

At least one of (a) the first channel wall and (b) the second channel wall may not extend inwardly between the adjacent support ribs in the region of the outflow edges in approximately half of the spacings between two adjacent support ribs.

At least one of (a) the first channel wall and (b) the second channel wall may extend inwardly approximately 70% to 120% of a length of chord of the support ribs.

At least one of (a) the first channel wall and (b) the second channel wall may arch outwardly out of the transition channel next to inflow edges of the support ribs.

The at least one of (a) the first channel wall and (b) the second channel wall may arch outwardly up to approximately 50% of a length of chord of the support ribs.

The support ribs may be adapted to guide a gas flow without deflection of the gas flow.

The support ribs may have a large wedge angle at outflow edges.

The flow structure may be positioned in the transition channel between two compressors.

The flow structure may be positioned in the transition channel between one of (a) a medium-pressure compressor and (b) a low-pressure compressor and a high-pressure compressor.

The flow structure may be positioned in the transition channel between two turbines.

The flow structure may be positioned in the transition channel between a high-pressure turbine and a low-pressure turbine.

The flow structure may be positioned in the transition channel of a turbine outlet housing downstream from a low-pressure turbine.

According to an example embodiment of the present invention, a flow structure for a gas turbine includes: high-pressure turbine blades arranged in a flow channel of a high-pressure turbine spaced apart from each other around a circumference, the turbine blades having large wedge angles at outflow edges; and at least one of (a) a first channel wall that delimits the flow channel radially on an inside and (b) a second channel wall that delimits the flow channel radially on an outside extending inwardly into the flow channel in an area of the outflow edges of the high-pressure turbine blades.

The gas turbine may include a gas turbine for an aircraft engine.

At least one of (a) the first channel wall and (b) the second channel wall may extend inwardly into the flow channel between two adjacent high-pressure turbine blades in the area of the outflow edges next to side walls of the high-pressure turbine blades.

At least one of (a) the first channel wall and (b) the second channel wall may not extend inwardly between two adjacent high-pressure turbine blades in the area of the outflow edges in approximately half of spacings between the two adjacent high-pressure turbine blades.

At least one of (a) the first channel wall and (b) the second channel wall may arch outwardly out of the flow channel next to inflow edges of the high-pressure turbine blades.

The high-pressure turbine blades may be adapted to deflect a gas flow.

Exemplary embodiments of the present invention are described in greater detail below with reference to the appended Figures.

DETAILED DESCRIPTION

Figure 1:
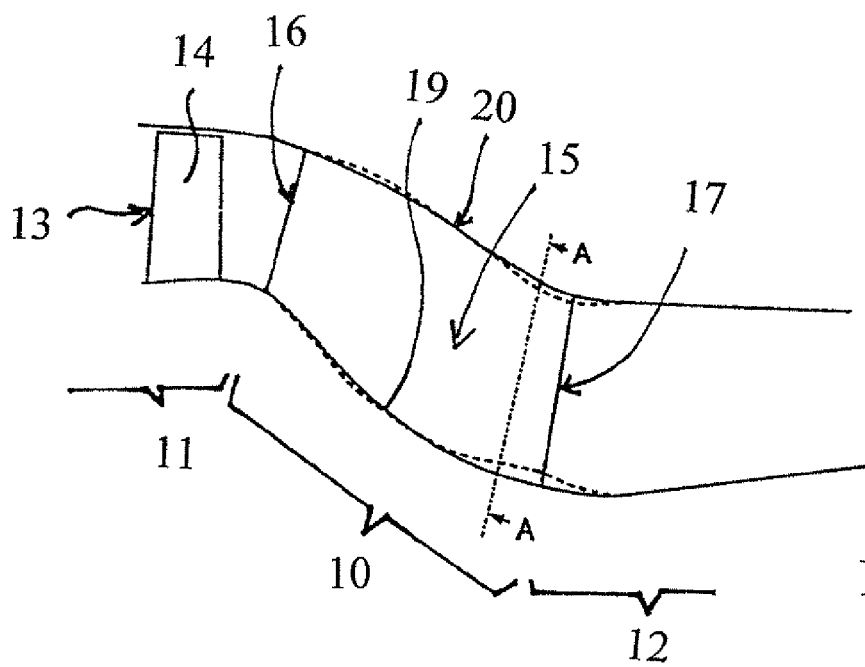
FIG. 1 is a schematic view of a flow structure according to an example embodiment of the present invention for a gas turbine, e.g., a flow structure for a transition channel between two compressor stages.
Figure 2:
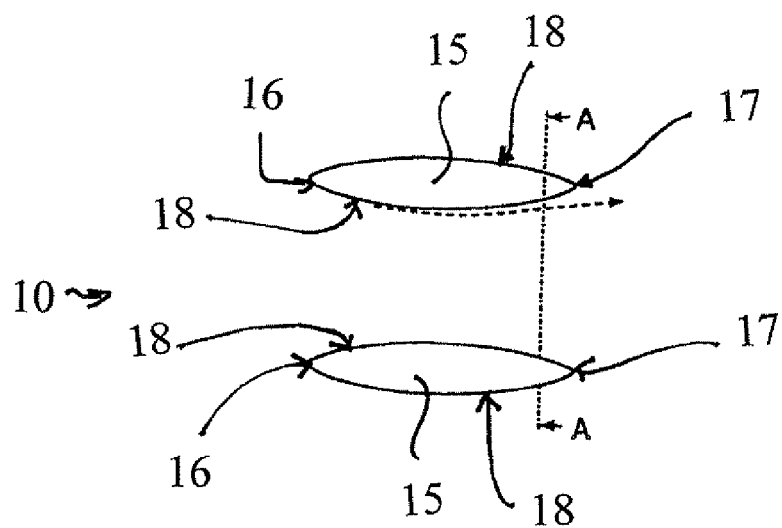
FIG. 2 is a cross-sectional view through the flow structure illustrated in FIG. 1 in the area of a hub.
Figure 3:
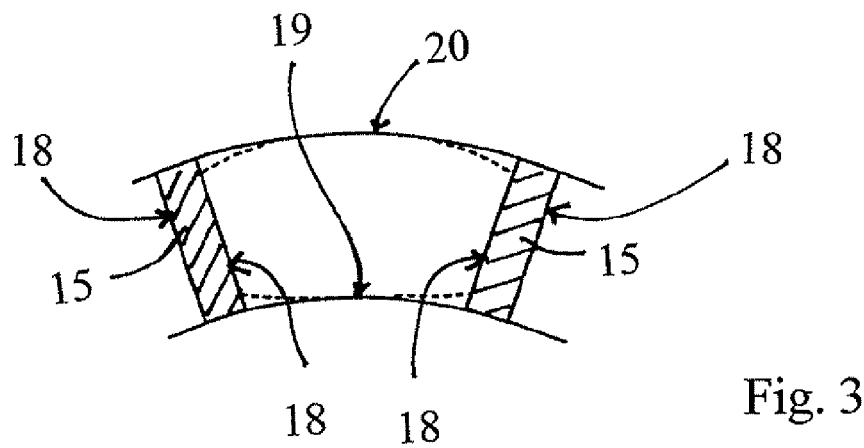
FIG. 3 is a cross-sectional view through the flow structure illustrated in FIGS. 1 and 2 in the direction of section A-A.

FIGS. 1 to 3 illustrate, in schematic form, an exemplary embodiment of a flow structure according to the present invention for a gas turbine in a transition channel 10 between a medium-pressure compressor 11 or a low-pressure compressor and a high-pressure compressor 12 of an aircraft engine implemented as a gas turbine, a gas flow through transition channel 10 from medium-pressure compressor 11 or low-pressure compressor being guided into the area of high-pressure compressor 12. FIG. 1 schematically illustrates that medium-pressure compressor 11 is terminated by a rotor blade ring 13 in the area of its last compressor stage, viewed in the flow direction. Rotor blade ring 13 is formed by multiple rotor blades 14 positioned at intervals from one another around the circumference.

As indicated in FIG. 2, for example, multiple support ribs 15 are positioned in the area of transition channel 10 at intervals from one another around the circumference of transition channel 10. Support ribs 15 are arranged to be relatively thick and relatively long and have a small height ratio. Support ribs 15 have relatively large wedge angles in the area of their inflow edges 16 and their outflow edges 17. Support ribs 15 are implemented such that they guide, but do not deflect the flow, so that their side walls 18 have an exclusive flow-guiding function.

Transition channel 10 is primarily delimited by two channel walls, e.g., by a radially interior channel wall 19 and a radially exterior channel wall 20. Channel walls 19 and 20 are illustrated in FIGS. 1 and 3, for example. FIGS. 1 and 3 illustrate channel walls 19 and 20 by solid lines and, in addition, by dashed lines. The solid lines indicate the contouring of channel walls 19 and 20, which may be conventional, while the dashed lines show the arrangement of channel walls 19 and 20 to provide the flow structure hereof.

In the exemplary embodiment illustrated in FIGS. 1 to 3, channel wall 19, which delimits transition channel 10 radially on the inside, and channel wall 20, which delimits transition channel 10 radially on the outside, are drawn inwardly into transition channel 10 in the area of outflow edges 17 of support ribs 15, and, as illustrated in FIG. 3, exclusively next to side walls 18 of support ribs 15. In contrast, in the area of half of the spacing between two neighboring support ribs 15 (see, e.g., FIG. 3), inner channel wall 19 and outer channel wall 20 are not drawn inwardly, but rather have the approximate contour that may be conventional. Accordingly, channel walls 19 and 20 are drawn inwardly into transition channel 10 in the area of outflow edges 17 of support ribs 15 exclusively next to side walls 18 thereof.

As illustrated in FIG. 1, inner channel wall 19 and outer channel wall 20 are drawn inwardly in an area between 70% and 120%, e.g., in an area between 80% and 110% of the length of chord of support ribs 15. It is thus illustrated in FIG. 1 that the area in which channel walls 19 or 20 are drawn inwardly into transition channel 10 also extends downstream from outflow edges 17 of support ribs 15.

As also illustrated in FIG. 1, the contouring of channel walls 19 and 20 not only deviates from conventional contouring in the area of outflow edges 17 of support ribs 15, but rather also in the area of inflow edges 16 thereof. Thus, it is illustrated in FIG. 1 that inner channel wall 19 and outer channel wall 20 are arched outwardly out of transition channel 10 in the area of inflow edges 16 of support ribs 15. The area in which the contour hereof inner channel wall 19 and outer channel wall 20 is arched outwardly out of transition channel 10 in relation to a conventional contour thereof extends up to approximately 50% of the length of chord of support ribs 15.

Although described with reference to FIGS. 1 to 3 for non-deflecting support ribs 15, it should be appreciated that example embodiments of the present invention may also be used with deflecting support ribs.

Furthermore, it should be appreciated that example embodiments of the present invention are not restricted to use in the area of support ribs positioned in transition channels, but rather may also be used on deflecting turbine blades having large wedge angles at their outflow edges. Thus, the flow structure according to example embodiments of the present invention may be used in the area of high-pressure turbine blades having large wedge angles at their outflow edges.

If the flow structure is used in transition channels, it may be located in a transition channel between two compressors or between two turbines. Thus, the flow structure may be positioned in a transition channel between a medium-pressure compressor or a low-pressure compressor and a high-pressure compressor. Furthermore, the flow structure may be located in a transition channel between a high-pressure turbine and a low-pressure turbine. The flow structure may also be located in a transition channel of a turbine outlet housing downstream from a low-pressure turbine.

LIST OF REFERENCE NUMERALS 10 transition channel
11 medium-pressure compressor
12 high-pressure compressor
13 rotor blade ring
14 rotor blade
15 support ribs
16 inflow edge
17 outflow edge
18 side wall
19 channel wall
20 channel wall

What is claimed is:

1. A flow structure for a gas turbine, comprising:
    support ribs arranged in a transition channel and spaced apart from each other around a circumference of the transition channel, the transition channel arranged one of (a) between two compressors, (b) between two turbines, and (c) in a turbine outlet housing downstream from a low-pressure turbine; and
    at least one of (a) a first channel wall that delimits the transition channel radially on an inside, the first channel wall extending into the transition channel in an area of outflow edges of the support ribs and (b) a second channel wall that delimits the transition channel radially on an outside, the second channel wall extending into the transition channel in an area of outflow edges of the support ribs.

2. The flow structure according to claim 1, wherein the gas turbine includes a gas turbine for an aircraft engine.

3. The flow structure according to claim 1, wherein at least one of (a) the first channel wall and (b) the second channel wall extends into the transition channel between two adjacent support ribs in the area of the outflow edges next to side walls of the support ribs.

4. The flow structure according to claim 1, wherein at least one of (a) the first channel wall and (b) the second channel wall does not extend inwardly between the adjacent support ribs in the region of the outflow edges in approximately half of the spacings between two adjacent support ribs.

5. The flow structure according to claim 1, wherein at least one of (a) the first channel wall and (b) the second channel wall extends inwardly approximately 70% to 120% of a length of chord of the support ribs.

6. The flow structure according to claim 1, wherein at least one of (a) the first channel wall and (b) the second channel wall arches outwardly out of the transition channel next to inflow edges of the support ribs.

7. The flow structure according to claim 6, wherein the at least one of (a) the first channel wall and (b) the second channel wall arches outwardly up to approximately 50% of a length of chord of the support ribs.

8. The flow structure according to claim 1, wherein the support ribs are adapted to guide a gas flow without deflection of the gas flow.

9. The flow structure according to claim 8, wherein the support ribs have a large wedge angle at outflow edges.

10. The flow structure according to claim 1, wherein the flow structure is positioned in the transition channel between two compressors.

11. The flow structure according to claim 1, wherein the flow structure is positioned in the transition channel between one of (a) a medium-pressure compressor and (b) a low-pressure compressor and a high-pressure compressor.

12. The flow structure according to claim 1, wherein the flow structure is positioned in the transition channel between two turbines.

13. the flow structure according to claim 1, wherein the flow structure is positioned in the transition channel between a high-pressure turbine and a low-pressure turbine.

14. The flow structure according to claim 1, wherein the flow structure is positioned in the transition channel of a turbine outlet housing downstream from a low-pressure turbine.

15. A flow structure for a gas turbine, comprising:
    high-pressure turbine blades arranged in a flow channel of a high-pressure turbine spaced apart from each other around a circumference, the turbine blades having large wedge angles at outflow edges; and
    at least one of (a) a first channel wall that delimits the flow channel radially on an inside, the first channel wall extending inwardly into the flow channel in an area of the outflow edges of the high-pressure turbine blades and (b) a second channel wall that delimits the flow channel radially on an outside, the second channel wall extending inwardly into the flow channel in an area of the outflow edges of the high-pressure turbine blades.

16. The flow structure according to claim 15, wherein the gas turbine includes a gas turbine for an aircraft engine.

17. The flow structure according to claim 15, wherein at least one of (a) the first channel wall and (b) the second channel wall extends inwardly into the flow channel between two adjacent high-pressure turbine blades in the area of the outflow edges next to side walls of the high-pressure turbine blades.

18. The flow structure according to claim 15, wherein at least one of (a) the first channel wall and (b) the second channel wall does not extend inwardly between two adjacent high-pressure turbine blades in the area of the outflow edges in approximately half of the spacings between the two adjacent high-pressure turbine blades.

19. The flow structure according to claim 15, wherein at least one of (a) the first channel wall and (b) the second channel wall arches outwardly out of the flow channel next to inflow edges of the high-pressure turbine blades.

20. The flow structure according to claim 15, wherein the high-pressure turbine blades are adapted to deflect a gas flow.

* * * * *